Figure 7:
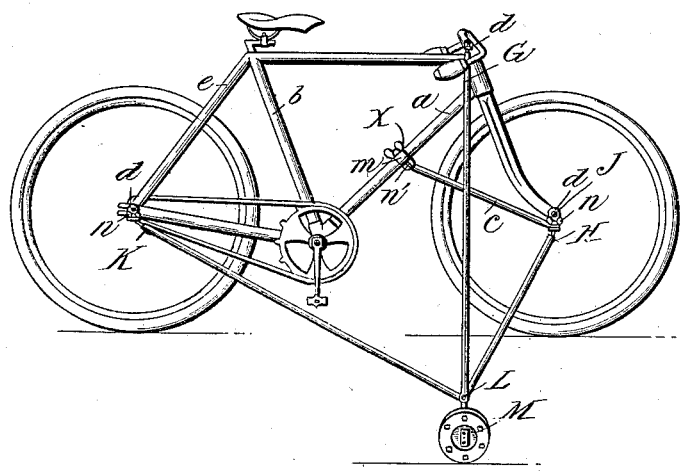

No. 722,078. PATENTED MAR. 3, 1903.
H. R. BLOMBERG.
BICYCLE ATTACHMENT.
APPLICATION FILED JULY 15, 1902.
NO MODEL. 2 SHEETS—SHEET 1.
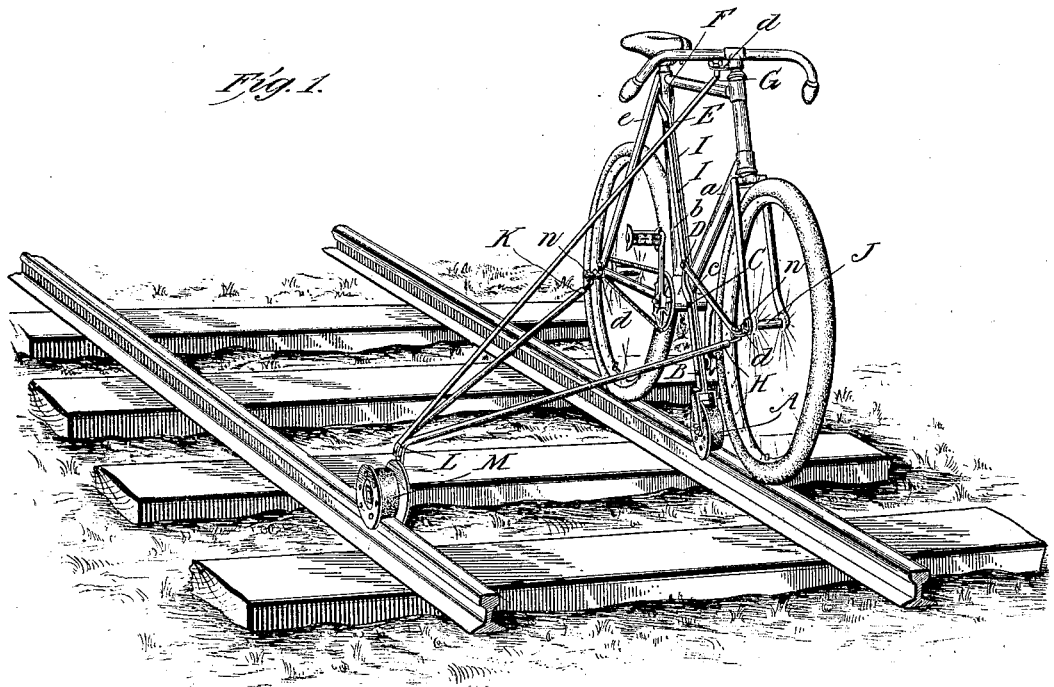
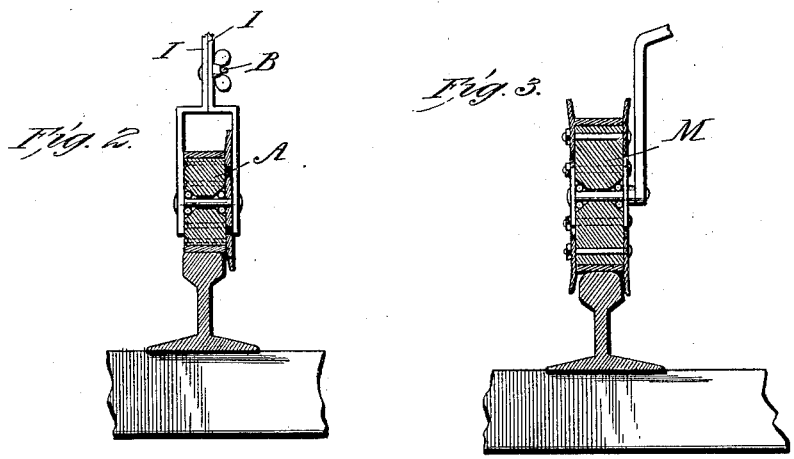
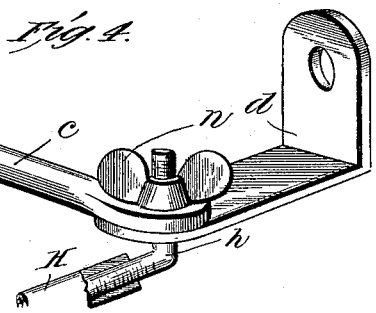
WITNESSES:
Geo. P. Kingsbury
Edw. W. Byrn
INVENTOR
Hjalmar R. Blomberg
BY Munn & Co.
ATTORNEYS.

No. 722,078. PATENTED MAR. 3, 1903.
H. R. BLOMBERG.
BICYCLE ATTACHMENT.
APPLICATION FILED JULY 15, 1902.
NO MODEL. 2 SHEETS—SHEET 2.

WITNESSES:
Geo. P. Kingsbury
Edw. W. Byrn

INVENTOR
Hjalmar R. Blomberg.
BY Munn & Co.
ATTORNEYS.

UNITED STATES PATENT OFFICE.

HJALMAR R. BLOMBERG, OF PRENTICE, WISCONSIN.

BICYCLE ATTACHMENT.

SPECIFICATION forming part of Letters Patent No. 722,078, dated March 3, 1903.

Application filed July 15, 1902. Serial No. 115,656. (No model.)

*To all whom it may concern:*

Be it known that I, HJALMAR R. BLOMBERG, a citizen of the United States, residing at Prentice, in the county of Price and State of Wisconsin, have invented a new and useful Improvement in Bicycle Attachments, of which the following is a specification.

My invention is in the nature of an improved bicycle attachment designed to enable any bicycle of standard make to run upon one of the rails of a railroad-track; and it consists in a peculiar construction and arrangement of a braced frame adapted to be connected to the several parts of the bicycle-frame and having guide-wheels that engage with both rails of the track to keep the plane of the two bicycle-wheels in true alinement with the rails and guide the machine as it moves along without tipping over or running off.

Figure 1 is a perspective view of a bicycle equipped with my attachment and shown applied to the rails of a railroad-track. Figs. 2, 3, 4 are details, and Figs. 5, 6, 7, and 8 are modifications.

A small wheel A, with an iron flange on the inner side of the rail, a wooden hub, and a rubber tire running in contact with the rail, is fitted with ball-bearings and attached to the frame of the bicycle by two flat bars or irons I I, clamped together by bolts B, C, D, E, and F and extending across the parts *a b e* of the bicycle-frame, the bolts firmly securing one bar on each side of the frame and keeping the wheel A directly in line with the bicycle-wheels and just behind the front one.

A brace-rod *c* connects the end of the front axle J with bolt D and prevents the front wheel from turning to the right or left while in use. The connecting-rods K L, G L, and H L converge outwardly toward the other track-rail and connect the bicycle to a small wheel M, similar to the small wheel A, except that it has a flange on each side. These rods are composed of five-eighth-inch iron or steel tubing, with ends K, G, and H threaded on the inside to take the stems *h*, Fig. 4, and G L and K L are flattened at L and both secured to H L at L by a single bolt.

The rods K L and H L are secured to the bicycle by means of flat right-angular bracket *d*, (see Fig. 4,) whose perforated end is slipped onto the axle under the nuts, while the other rod is connected to the handle-bar at G, the connecting ends of the rods at K and H being provided with a bent screw-stem *h*, turned up at right angles and passed through holes in the brackets at these points, as seen in Fig. 4.

All connections and bolts are fitted with thumb-nuts *n*, so that the entire attachment can be removed without tools. To remove the attachment from operative position, the rods K L, G L, and H L, with wheel M, are loosened and folded flat and with brace-rod *c* are strapped to the frame, bolts C, D, E, and F being removed and the bars I, with wheel A, raised, so that bolts C, E, and F can be replaced above the parts *a b e* of the diamond frame instead of under. The bicycle is then ready for traveling on the ordinary road-bed.

The brace-rods, composed of gas-pipe, are threaded deep enough (see Fig. 4) so that the exact length may be obtained in adjusting the attachment by simply turning the bent stem *h*, that screw into the ends of the said rods or tubes.

In connecting the front end of the brace-rod *c* to the axle of the front wheel the front end of said rod is flattened and perforated and slipped over the upturned end of the screw-stem *h*, as seen in Fig. 4, and is secured by the same thumb-nut that secures rod L H.

Figure 5:
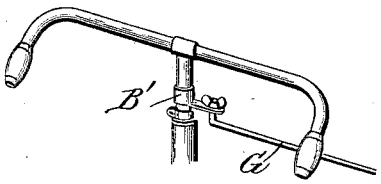

Another feature of my invention is intended to slightly tip the bicycle toward the inside of a curve in the track while riding over the same or to enable the rider to tip the bicycle slightly toward the wind when riding in a strong side wind blowing from the side to which the attachment is attached. This is accomplished by attaching the rod G L, running to the handle-bar of the bicycle, to a clamp surrounding the stem to the handle-bar at a point above the shank to the forks and eccentrically to the shank, using a similar bracket to that before described, and then slightly loosening the clamp holding the handle-bar so that it may be turned and by so doing tip the wheel, as before explained. This method of attaching to the shank of the handle-bar is shown in Fig. 5, in which B' shows the second clamp to which the attachment is made.

Figure 6:
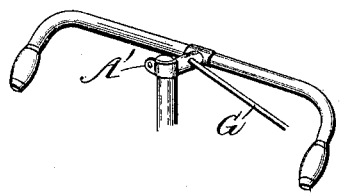
Figure 8:
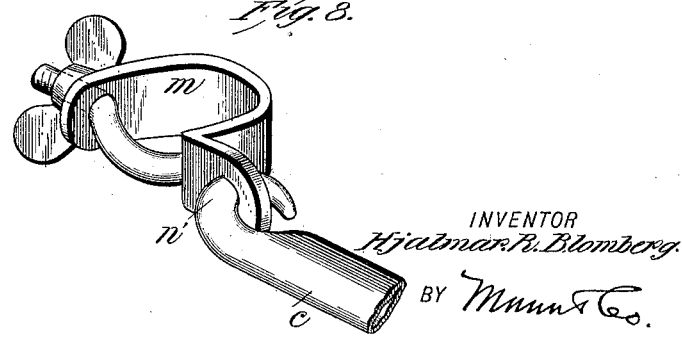

In some makes of wheels where the handle-bar is attached to the clamp surrounding the shank to the forks instead of to a stem running down inside of the shank this extra clamp is not needed, as the attachment of the brace-rod to this clamp gives the same effect. This second plan is illustrated by Fig. 6, which shows at A' the point of attachment to the clamp holding the handle-bars.

Fig. 7 represents a modification in which the attachment may be used without the small wheel A, in which case the brace-rod c, that connects the hub J with bolt D, will be attached to the front part a of the diamond frame at X by means of the clip m and hook n'. (Shown in Fig. 8.)

I am aware that a bicycle attachment has been constructed to adapt it to run on railway-tracks in which a converging framework carried a wheel that ran upon one of the rails and that such attachments have been constructed to lean over in resisting wind-pressure or in turning curves, and I do not, therefore, claim these features broadly, but only my novel construction and arrangement of parts.

Having thus described my invention, what I claim as new, and desire to secure by Letters Patent, is—

1. A bicycle attachment comprising three rods converging and connected together at one end and provided with a flanged wheel for one of the track-rails and the other ends of said rods connected respectively to the front axle, the rear axle, and the handles, and each of said connections comprising an internally-screw-threaded end for the rod, a right-angular screw-stem turned into the same, a flat right-angular bracket having perforated ends, one perforated end embracing the right-angular screw-stem and being provided with and secured by a nut, and the other ends of the flat brackets being secured respectively upon the axles and handle-bar substantially as described.

2. A bicycle attachment comprising a laterally-projecting frame composed of three converging rods carrying a flanged wheel at their outer ends and a locking-bar c connecting the front axle to the bicycle-frame, so that the front wheel cannot turn about its handle-bar axis substantially as described.

3. A bicycle attachment comprising a laterally-projecting frame composed of three converging rods carrying at their outer ends a flanged wheel, one of said rods being connected to the axle of the front wheel and a locking-bar c connected at its rear end to the frame of the bicycle and at its forward end connected to the joint between the front axle and its laterally-projecting rod extending to the flanged wheel substantially as described.

4. A bicycle attachment comprising means for locking the front wheel against pivotal turning, a laterally-projecting frame bearing a flanged wheel for the outer track-rail, the upper one of the rods of the said frame being connected to the handle-bar stem at an eccentric point, whereby the turning of the handle-bar will, when its clamp is loosened, take up the length of the upper laterally-projecting rods and cause the plane of the bicycle to lean for turning curves or resisting wind-pressure as described.

HJALMAR R. BLOMBERG.

Witnesses:
H. T. SINGLETON,
J. W. HICKS.